(12) United States Patent
Bauer et al.

(10) Patent No.: US 9,505,904 B2
(45) Date of Patent: *Nov. 29, 2016

(54) MIXTURES OF ALUMINUM HYDROGENPHOSPHITES WITH ALUMINUM SALTS, PROCESS FOR THE PRODUCTION THEREOF AND THE USE THEREOF

(71) Applicants: Harald Bauer, Kerpen (DE); Sebastian Hoerold, Diedorf (DE); Martin Sicken, Cologne (DE)

(72) Inventors: Harald Bauer, Kerpen (DE); Sebastian Hoerold, Diedorf (DE); Martin Sicken, Cologne (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,884

(22) PCT Filed: Nov. 28, 2012

(86) PCT No.: PCT/EP2012/004906
§ 371 (c)(1),
(2) Date: Nov. 6, 2014

(87) PCT Pub. No.: WO2013/083248
PCT Pub. Date: Jun. 13, 2013

(65) Prior Publication Data
US 2015/0299419 A1    Oct. 22, 2015

(30) Foreign Application Priority Data
Dec. 5, 2011   (DE) .................. 10 2011 120 190

(51) Int. Cl.
| | |
|---|---|
| *C08K 3/32* | (2006.01) |
| *C01B 25/163* | (2006.01) |
| *C01B 25/165* | (2006.01) |
| *C08K 7/14* | (2006.01) |

(52) U.S. Cl.
CPC ............... *C08K 3/32* (2013.01); *C01B 25/163* (2013.01); *C01B 25/165* (2013.01); *C08K 7/14* (2013.01); *C01P 2004/61* (2013.01); *C01P 2006/11* (2013.01); *C01P 2006/62* (2013.01); *C01P 2006/63* (2013.01); *C01P 2006/64* (2013.01); *C01P 2006/82* (2013.01); *C08K 2003/329* (2013.01)

(58) Field of Classification Search
CPC ........................................................ C08K 3/32
USPC ........................................................ 524/414
See application file for complete search history.

(56) References Cited

U.S. PATENT DOCUMENTS

| | | |
|---|---|---|
| 5,256,718 A | 10/1993 | Yamamoto et al. |
| 5,965,639 A | 10/1999 | Yamauchi et al. |
| 6,136,892 A | 10/2000 | Yamauchi et al. |
| 6,207,736 B1 | 3/2001 | Nass et al. |
| 6,365,071 B1 | 4/2002 | Jenewein et al. |
| 6,509,401 B1 | 1/2003 | Jenewein et al. |
| 2006/0020064 A1 | 1/2006 | Bauer et al. |
| 2006/0287418 A1 | 12/2006 | Bauer et al. |
| 2008/0090950 A1 | 4/2008 | Costanzi et al. |
| 2010/0224840 A1 | 9/2010 | Hawkes et al. |
| 2013/0190432 A1 | 7/2013 | Krause et al. |
| 2014/0309339 A1 | 10/2014 | Schneider et al. |
| 2014/0309340 A1 | 10/2014 | Schneider et al. |
| 2014/0329933 A1 | 11/2014 | Schneider et al. |
| 2014/0336325 A1 | 11/2014 | Bauer et al. |
| 2014/0350149 A1 | 11/2014 | Schneider et al. |
| 2014/0371361 A1 | 12/2014 | Bauer et al. |
| 2015/0005421 A1 | 1/2015 | Schneider et al. |
| 2015/0005427 A1 | 1/2015 | Bauer et al. |
| 2015/0018464 A1 | 1/2015 | Bauer et al. |

FOREIGN PATENT DOCUMENTS

| | | |
|---|---|---|
| CA | 2218792 | 4/1998 |
| DE | 1961424 | 10/1997 |
| DE | 19734437 | 2/1999 |
| DE | 19737727 | 7/1999 |
| EP | 0838493 | 4/1998 |
| EP | 0896023 | 2/1999 |
| EP | 1624015 | 2/2006 |
| JP | 2175604 | 7/1990 |
| JP | 04-89306 | * 3/1992 |
| JP | 2899916 | 6/1999 |
| JP | 2011-225723 | 11/2011 |
| WO | WO 2012/045414 | 4/2012 |

OTHER PUBLICATIONS

Derwent translation of JP 04-89306 (1999).*
PCT International Search Report for PCT/EP2012/004906, mailed Feb. 4, 2013.

(Continued)

*Primary Examiner* — Doris Lee
(74) *Attorney, Agent, or Firm* — Anthony A. Bisulca

(57) ABSTRACT

The invention relates to mixtures of aluminum hydrogenphosphites of the formula (I)

$$Al_{2.00}(HPO_3)_v(H_2PO_3)_y \cdot x(H_2O)_z \quad (I)$$

and aluminum salts comprising 91 to 99.9% aluminum hydrogenphosphites of the formula (I)

0.1 to 9% aluminum salts and 0 to 50% water (of crystallization), where v in formula (I) is 2 to 2.99, y is 2 to 0.01 and z is 0 to 4, to processes for preparation thereof and to the use thereof.

16 Claims, No Drawings

(56) References Cited

OTHER PUBLICATIONS

Morris R. et al: "Synthesis and Structures of Two Isostructural Phosphites, Al2(HPO3)3 and Ga2(HPO3)3", ACTA Crystallographica Section C. Crystal Structure Communications, Munksgaard, Copenhagen, DK, vol. 50, No. 4: pp. 473-476, Apr. 1, 1994. XP009166285.
English Translation of PCT International Preliminary Report on Patentability for PCT/EP2012/004906, Jun. 10, 2014.
Machine English Abstract of JP 2175604, Jul. 6, 1990.
Yang Yali, Li Niu, Xiang Shouhe, Guan Naijia, "Hydrothermal synthesis and structure characteristics of single aluminophosphite $[Al_2(HPO_3)_3(H_2O)_3]H_2O$ crystals". Institute of New Catalytic Materials Science, Nankai University, Tianjin 300071, China, Oct. 2006, pp. 1-6.
PCT International Search Report for PCT/EP2012/004908, mailed Feb. 4, 2013.
English Translation of PCT International Preliminary Report on Patentability for PCT/EP2012/004908, Jun. 10, 2014.
PCT international Search Report for PCT/EP2012/004905, mailed May 2, 2013.
PCT International Preliminary Report on Patentability for PCT/EP2012/004905, mailed Jun. 10, 2014.
United States Patent and Trademark Office Office Action for U.S. Appl. No. 14/362,870 dated Sep. 25, 2015.
United States Patent and Trademark Office Office Action for U.S. Appl. No. 14/362,876 dated Feb. 26, 2016.
Machine Translation of JP 2899916, Jun. 2, 1999.
United States Patent and Trademark Office Office Action for U.S. Appl. No. 14/362,686 dated Dec. 6, 2014.
United States Patent and Trademark Office Office Action for U.S. Appl. No. 14/362,886 dated Jun. 19, 2015.
United States Patent and Trademark Office Office Action for U.S. Appl. No. 14/362,886 dated Nov. 12, 2015.
United States Patent and Trademark Office Office Action for U.S. Appl. No. 14/362,886 dated Feb. 17, 2010.
United States Patent and Trademark Office Notice of Allowance for U.S. Appl. No. 14/362,886 dated Mar. 10, 2016.
Machine Translation of JP 2011-225723, Feb. 2, 2016.

\* cited by examiner

MIXTURES OF ALUMINUM HYDROGENPHOSPHITES WITH ALUMINUM SALTS, PROCESS FOR THE PRODUCTION THEREOF AND THE USE THEREOF

The present invention relates to mixtures of aluminum hydrogenphosphites with aluminum salts, to processes for preparation thereof and to the use thereof.

Pure aluminum phosphites, which are typically microporous compounds which are of zeolite-like structure and in which aluminum ions and phosphite ions form a three-dimensional network of multimembered rings, are known. They may contain water of crystallization or release water of crystallization with loss of the crystal structure and thus form anhydrates. According to the prior art, crystallization is effected by hydrothermal means, i.e. above the boiling point of water under the autogenous pressure thereof. To facilitate the crystallization (Yang. Shiyou Xuebao, Shiyou Jiagong (2006), 22 (Suppl.), 79-81), polynitrogen compounds are added as structure-directing agents—also called templates.

The present invention relates to mixtures of aluminum hydrogenphosphites with aluminum salts. These aluminum hydrogenphosphites contain protonated phosphite ions in considerable molar proportions bound within the substance.

It has been found that, surprisingly, the inventive mixtures of aluminum hydrogenphosphites with aluminum salts are usable as synergists to flame retardants. These flame retardant synergists need not themselves be flame-retardant, but may significantly enhance the efficacy of flame retardants. Typically, the flame retardant synergists are mixed together with flame retardants and further polymer additives by kneading and extrusion with the polymer. This is done at temperatures at which the polymer is in molten form and which can distinctly exceed 320° C. for a brief period. The flame retardant synergists must withstand these temperatures without decomposition in order that a flame-retardant polymer mixture is ultimately obtained. It has now been found that, surprisingly, the inventive mixtures of aluminum hydrogenphosphites and aluminum salts are much more thermally stable than pure aluminum phosphites.

In addition, the prior art discloses aluminum phosphite hydrates, but these disadvantageously release water when heated and hence have a disruptive effect in the course of processing of the synergist to give a flame-retardant polymer. It is another object of the invention to avoid this release of water. This object is achieved by the inventive mixture of aluminum hydrogenphosphites with aluminum salts, since this mixture is substantially free of water of crystallization.

Also known are mixtures of aluminum hydrogenphosphites with aluminum hydroxide. A disadvantage is the reduction in the active phosphite content by the aluminum hydroxide content. The object of the invention of a maximum active phosphite content is achieved by the inventive mixtures of aluminum hydrogenphosphites with aluminum salts, since the specific phosphite content in salts with monovalent phosphorus ions is higher than in compounds with divalent phosphorus ions. Moreover, mixtures of aluminum phosphites with aluminum hydroxide are less thermally stable than mixtures of the inventive aluminum hydrogenphosphites with aluminum salts.

The invention thus relates to mixtures of aluminum hydrogenphosphites of the formula (I)

$$Al_{2.00}(HPO_3)_v(H_2PO_3)_y \cdot x(H_2O)_z \quad (I)$$

with aluminum salts comprising
91 to 99.9% by weight of aluminum hydrogenphosphites of the formula (I)
0.1 to 9% by weight of aluminum salts and
0 to 50% by weight of water (of crystallization),
where v in formula (I) is 2 to 2.99, y is 2 to 0.01 and z is 0 to 4.

Preferably,
v is 2.56 to 2.99,
y is 0.9 to 0.02 and
z is 0 to 1.

More preferably,
v is 2.834 to 2.99,
y is 0.332 to 0.03 and
z is 0.01 to 0.1.

The mixtures of the aluminum hydrogenphosphites with aluminum salts as claimed in one or more of claims 1 to 6 preferably have a particle size of 0.1 to 1000 μm, a solubility in water of 0.01 to 10 g/l, a bulk density of 80 to 800 g/l and a residual moisture content of 0.1 to 5%.

The aluminum salts are preferably aluminum metal, aluminum alloys, oxides, hydroxides, peroxides, peroxide hydrates, carbonates, percarbonates, mixed carbonates/hydrates, formates, acetates, propionates, stearates, lactates, ascorbates, oxalates, or aluminum salts with anions of acids having a higher vapor pressure than phosphorous acid.

The present object is also achieved by a process for preparing mixtures of aluminum hydrogenphosphites with aluminum salts as claimed in one or more of claims 1 to 6, which comprises reacting, in a ratio of 2.5 to 3.5 mol, a phosphorus source with 2 mol of an aluminum source at 50 to 300° C. without using a solvent.

Preference is given to executing the reaction at 120 to 220° C.

The aluminum sources are preferably aluminum metal, aluminum alloys, oxides, hydroxides, peroxides, peroxide hydrates, carbonates, percarbonates, mixed carbonates/hydrates, formates, acetates, propionates, stearates, lactates, ascorbates, oxalates, or aluminum salts with anions of acids having a higher vapor pressure than phosphorous acid.

The phosphite sources are preferably phosphorous acid, phosphorus trioxide, phosphorus trichloride, elemental phosphorus and/or hypophosphorous acid.

The invention also relates to the use of aluminum hydrogenphosphites with aluminum salts as claimed in at least one of claims 1 to 6 as an intermediate for further syntheses, as a binder, as a crosslinker or accelerator in the curing of epoxy resins, polyurethanes, unsaturated polyester resins, as polymer stabilizers, as crop protection compositions, as sequestrants, as a mineral oil additive, as an anticorrosive, in washing and cleaning composition applications and in electronics applications.

The invention especially relates to the use of aluminum hydrogenphosphites with aluminum salts as claimed in at least one of claims 1 to 6, especially as a flame retardant, especially flame retardant for clearcoats and intumescent coatings, as a flame retardant for wood and other cellulosic products, as a reactive and/or nonreactive flame retardant for polymers, for production of flame-retardant polymer molding compositions, for production of flame-retardant polymer moldings and/or for rendering polyester and pure and blended cellulose fabrics flame-retardant by impregnation, and as a synergist in flame retardant mixtures.

The invention also encompasses flame-retardant thermoplastic or thermoset polymer molding compositions and polymer moldings, films, filaments and fibers comprising 0.1 to 45% by weight of mixtures of aluminum hydrogenphosphites with aluminum salts as claimed in at least one of claims 1 to 6, 55 to 99.9% by weight of thermoplastic or thermoset polymer or mixtures thereof, 0 to 55% by weight of additives and 0 to 55% by weight of filler or reinforcing materials, where the sum of the components is 100% by weight.

The invention also relates to flame-retardant thermoplastic or thermoset polymer molding compositions and polymer moldings, films, filaments and fibers comprising 0.1 to 45% by weight of a flame retardant mixture comprising 0.1 to 50% by weight of a mixture of aluminum hydrogenphosphites with aluminum salts as claimed in at least one of claims 1 to 6 and 50 to 99% by weight of flame retardant, 55 to 99.9% by weight of thermoplastic or thermoset polymer or mixtures thereof, 0 to 55% by weight of additives and 0 to 55% by weight of filler or reinforcing materials, where the sum of the components is 100% by weight.

The flame retardant preferably comprises dialkylphosphinic acids and/or salts thereof; condensation products of melamine and/or reaction products of melamine with phosphoric acid and/or reaction products of condensation products of melamine with polyphosphoric acid or mixtures thereof; nitrogen-containing phosphates of the formulae $(NH_4)_y H_{3-y} PO_4$ or $(NH_4 PO_3)_z$, where y is 1 to 3 and z is 1 to 10 000; benzoguanamine, tris(hydroxyethyl) isocyanurate, allantoin, glycoluril, melamine, melamine cyanurate, dicyandiamide and/or guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate.

The flame retardant more preferably comprises melam, melem, melon, dimelamine pyrophosphate, melamine polyphosphate, melam polyphosphate, melon polyphosphate and/or melem polyphosphate and/or mixed poly salts thereof and/or ammonium hydrogenphosphate, ammonium dihydrogenphosphate and/or ammonium polyphosphate.

Preferred flame retardants are also aluminum hypophosphite, zinc hypophosphite, calcium hypophosphite, sodium phosphite, monophenylphosphinic acid and salts thereof, mixtures of dialkylphosphinic acids and salts thereof with monoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof and adducts onto para-benzoquinone, or itaconic acid and salts thereof.

The content of water of crystallization is preferably in the range of 0-5% by weight, especially 0-1% by weight.

Preferred alkali metal sources are, for example, alkali metal salts.

The inventive mixtures of aluminum hydrogenphosphites with aluminum salts preferably have a bulk density of 200 to 700 g/l.

The inventive mixtures of aluminum hydrogenphosphites with aluminum salts preferably have an L color value of 85 to 99.9, more preferably of 90 to 98.

The inventive mixtures of aluminum hydrogenphosphites with aluminum salts preferably have an a color value of −4 to +9, more preferably of −2 to +6.

The inventive mixtures of aluminum hydrogenphosphites with aluminum salts preferably have a b color value of −2 to +6, more preferably of −1 to +3.

The color values are reported in the Hunter system (CIE-LAB system, Commission Internationale d'Eclairage). L values range from 0 (black) to 100 (white), a values from −a (green) to +a (red), and b values from −b (blue) to +b (yellow).

Preferred phosphite sources are phosphorous acid or precursors thereof. Precursors are substances which can form phosphite ions under the conditions of the process, for example phosphorus trioxide ($P_2O_6$) which can form phosphorous acid under hydrolysis, phosphorus trichloride, and elemental phosphorus or hypophosphorous acid which can be converted to phosphorous acid by oxidation.

It is an object of the present invention to provide template-free mixtures of aluminum hydrogenphosphites with aluminum salts. It was a further object to provide a process which does not require the templates or aqueous suspension.

Preferred reaction conditions are temperatures of 0 to 300° C., more preferably of 50 to 170° C., and reaction times of $10^{-7}$ to $10^2$ h. The pressure may vary between 1 and 200 MPa (=0.00001 to 200 bar), preferably between 10 Pa and 10 MPa.

Preference is given to an energy input of 0.083 to 10 kW/m³, more preferably 0.33-1.65 kW/m³.

A preferred reaction methodology is to initially charge the aluminum source and to meter in the phosphite source. In an alternative preferred reaction methodology, aluminum source and phosphite source are metered in simultaneously.

The reaction mixture can solidify. Preference is therefore given to a multistage procedure: preliminary reaction in a reactor (e.g. kneader, mixer, rotary tube) to give a solid material, grinding (e.g. mill, kneader, rotary tube with milling internals), subsequent heat treatment in a reactor (e.g. kneader, mixer, rotary tube).

Alternatively, the whole reaction can be conducted in a heated grinding apparatus.

Preference is given to metering the phosphite source and aluminum source into an initial charge of reaction mixture which has reacted.

The weight ratio of reacted reaction mixture to new material is 1:100 to 80:20, preferably 30:70 to 70:30.

Preference is given to initially charging 1 to 50% by weight of mixtures of aluminum hydrogenphosphites with aluminum salts, adding 50-99% by weight of a mixture of aluminum source and phosphite source in a ratio of 1.5 to 2.5 mol:3 mol, reacting them at 20 to 300° C. for 0.1 to 10 h and then reacting them at 80 to 300° C. for 0.9 to 10 h.

Preference is also given to initially charging 2 to 20% by weight of mixtures of aluminum hydrogenphosphites with aluminum salts, adding 80 to 98% by weight of a mixture of aluminum source and phosphite source in a ratio of 1.9 to 2.1 mol:3 mol, reacting them at 50 to 270° C. for 0.5 to 5 h and then reacting them at 100 to 180° C. for 0.5 to 5 h.

Preference is given to the use of the inventive mixtures of aluminum hydrogenphosphites with aluminum salts as a flame retardant synergist.

Preference is also given to compositions comprising 5 to 99.8% by weight of mixtures of aluminum hydrogenphosphites of the formula (I) and aluminum salts 0.1 to 94.9% by weight of dialkylphosphinic acids or salts thereof and 0.1 to 30% by weight of one or more polymer additives.

Preferred dialkylphosphinic acids and/or salts thereof are those of the formula (II)

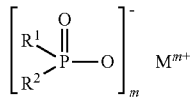
(II)

in which
R¹, R² are the same or different and are each linear or branched $C_1$-$C_6$-alkyl;
M is Mg, Ca, Al, Sb, Sn, Ge, Ti, Fe, Zr, Zn, Ce, Bi, Sr, Mn, Li, Na, K, H;
m is 1 to 4.

Preferred dialkylphosphinic salts are aluminum trisdiethylphosphinate, aluminum trismethylethylphosphinate, titanyl bisdiethylphosphinate, titanium tetrakisdiethylphosphinate, titanyl bismethylethylphosphinate, titanium tetrakismethylethylphosphinate, zinc bisdiethylphosphinate, zinc bismethylethylphosphinate and mixtures thereof.

Suitable further flame retardants are also particular nitrogen compounds (DE-A-196 14 424, DE-A-197 34 437 and DE-A-197 37 727). Particularly suitable flame retardants correspond to the formulae (III) to (VIII) or mixtures thereof

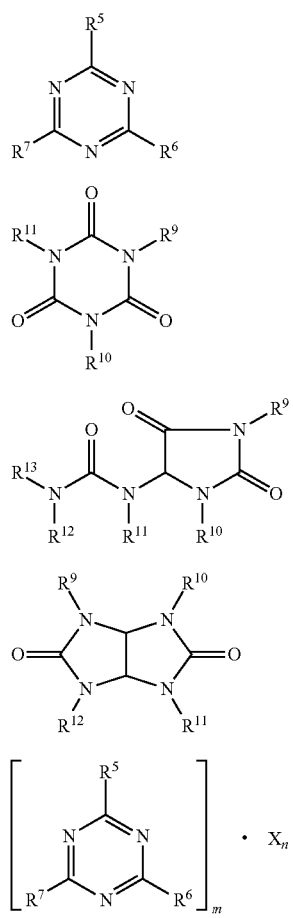

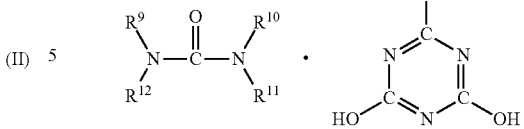
(VIII)

in which
$R^5$ to $R^7$ are each hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, both N-alicyclic and N-aromatic,
$R^8$ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl,
$R^9$ to $R^{13}$ are the same groups as $R^8$, and also —O—$R^8$,
m and n are each independently 1, 2, 3 or 4,
X denotes acids which can form adducts with triazine compounds (III);
or oligomeric esters of tris(hydroxyethyl) isocyanurate with aromatic polycarboxylic acids.

Particularly suitable flame retardants are benzoguanamine, tris(hydroxyethyl) isocyanurate, allantoin, glycoluril, melamine, melamine cyanurate, dicyandiamide and/or guanidine.

Suitable polymer additives for flame-retardant polymer molding compositions and polymer moldings are UV absorbers, light stabilizers, lubricants, colorants, antistats, nucleating agents, fillers, synergists, reinforcers and others.

Preference is given to the use of the inventive flame-retardant polymer moldings as lamp components such as lamp fittings and holders, plugs and multisocket extensions, bobbins, housing for capacitors and contactors, and circuit breakers, relay housing and reflectors.

The invention also relates to an intumescent flame-retardant coating comprising 1 to 50% by weight of the inventive mixture of aluminum hydrogenphosphites with aluminum salts of the formula (I), and 0 to 80% by weight of ammonium polyphosphate, binder, foam former, fillers and polymer additives.

The intumescent flame-retardant coating preferably comprises 1 to 50% by weight of the inventive mixtures of aluminum hydrogenphosphites with aluminum salts, and 0 to 80% by weight of ammonium polyphosphate, binder, foam former, dialkylphosphinic acid salts, fillers and polymer additives.

The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrole® 143E (BASF)), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The styrene polymers are preferably comparatively coarse-pore foam such as EPS (expanded polystyrene), e.g. Styropor (BASF) and/or foam with relatively fine pores such as XPS (extruded rigid polystyrene foam), e.g. Styrodur® (BASF). Preference is given to polystyrene foams, for example Austrotherm® XPS, Styrofoam® (Dow Chemical), Floormate®, Jackodur®, Lustron®, Roofmate®, Styropor, Styrodur®, Styrofoam®, Sagex® and Telgopor®.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha,beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxides and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, polyamides or copolyamides modified with EPDM (ethylene-propylene-diene rubber) or ABS (acrylonitrile-butadiene-styrene); and polyamides condensed during processing ("RIM polyamide systems").

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates and polyester carbonates, and also polysulfones, polyether sulfones and polyether ketones.

Preferably, the polymers are crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

Suitable compounding units for production of polymer molding compositions are single-shaft extruders or single-screw extruders, for example from Berstorff GmbH, Hanover and/or from Leistritz, Nuremberg, and multizone screw extruders with three-zone screws and/or short compression screws, and twin-screw extruders, for example from Coperion Werner & Pfleiderer GmbH & Co. KG, Stuttgart (ZSK 25, ZSK30, ZSK 40, ZSK 58, ZSK MEGA-compounder 40, 50, 58, 70, 92, 119, 177, 250, 320, 350, 380) and/or from Berstorff GmbH, Hanover, Leistritz Extrusionstechnik GmbH, Nuremberg.

Usable compounding units are also co-kneaders, for example from Coperion Buss Compounding Systems, Pratteln, Switzerland, e.g. MDK/E46-11D and/or laboratory kneaders (MDK 46 from Buss, Switzerland with effective screw lengths L=11 D).

Suitable compounding units are also ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Likewise usable are compounders with a contrarotatory twin screw, for example Compex 37 and 70 models from Krauss-Maffei Berstorff.

Inventive effective screw lengths in the case of single-shaft extruders or single-screw extruders are 20 to 40 D, in the case of multizone screw extruders, for example, 25 D with intake zone (L=10 D), transition zone (L=6 D), ejection zone (L=9 D), and in the case of twin-screw extruders 8 to 48 D.

Production, Processing and Testing of Flame-Retardant Polymer Molding Compositions and Polymer Moldings The flame-retardant components were mixed with the polymer pellets and any additives and incorporated in a twin-screw extruder (model: Leistritz LSM 30/34) at temperatures of 230 to 260° C. (PBT-GR) or of 260 to 280° C. (PA 66-GR). The homogenized polymer strand was drawn off, cooled in a water bath and then pelletized.

After sufficient drying, the molding compositions were processed on an injection molding machine (model: Aarburg Allrounder) at melt temperatures of 240 to 270° C. (PBT-GR) or of 260 to 290° C. (PA 66-GR) to give test specimens.

Test specimens of each mixture were used to determine the UL 94 fire class (Underwriter Laboratories) on specimens of thickness 1.5 mm.

The UL 94 fire classifications are as follows:

V-0: afterflame time never longer than 10 sec, total of afterflame times for 10 flame applications not more than 50 sec, no flaming drops, no complete consumption of the specimen, afterglow time for specimens never longer than 30 sec after end of flame application V-1: afterflame time never longer than 30 sec after end of flame application, total of afterflame times for 10 flame applications not more than 250 sec, afterglow time for specimens never longer than 60 sec after end of flame application, other criteria as for V-0

V-2: cotton indicator ignited by flaming drops, other criteria as for V-1. Not classifiable (ncl): does not fulfill fire class V-2.

The composition of the aluminum hydrogenphosphites (empirical formula) can be determined from the P and Al analysis data. Forming the sum of the cationic charges and the anionic charges, this is possible when the anionic charges are distributed between divalent phosphite ions and monovalent hydrogenphosphite ions.

The composition of a mixture of aluminum salt and aluminum hydrogenphosphite can be determined by, for example, determining aluminum hydroxide via x-ray powder diffractometry (reflection at an angle of 2 theta approx. 18.3 degrees) and defining the remainder of phosphorus and aluminum in the sample as aluminum hydrogenphosphite. The latter is justified by very low contents of unconverted phosphorous acid.

Determination of Unconverted Phosphorous Acid

To determine the unconverted phosphorous acid, the resulting product as a 10% aqueous suspension is boiled at reflux at 100° C. for 24 h, then filtered, and the phosphorus content is determined, and this is used to calculate the $H_3PO_3$ content in the sample.

Test of Thermal Stability and Phosphine Formation

An important criterion for the thermal stability of the inventive aluminum hydrogenphosphites is the temperature at which decomposition occurs and toxic $PH_3$ is formed. The release thereof in the course of production of flame-retardant polymers must be avoided. For the determination, a material sample is heated in a tubular oven under flowing nitrogen (30 l/g), by raising the temperature stepwise. The decomposition temperature has been attained when a Dräger detection tube can detect more than 1 ppm $PH_3$ (short-term tube for hydrogen phosphide).

The invention is illustrated by the examples which follow. Amounts, conditions and analyses are listed in the table.

EXAMPLE 1

1608.3 g of aluminum hydroxide (Hydral® 710; ALCOA; 99.6%) are initially charged in a kneader. While mixing, 2864 g of phosphorous acid (98%) are added in portions. A reaction occurs spontaneously with evolution of heat and the mixture is left to react at 150° C. The product contains 98.6% by weight of aluminum phosphite of the composition $Al_2(HPO_3)_{2.89}(H_2PO_3)_{0.22}$, 1.4% by weight of aluminum hydroxide and 0.25% by weight of unconverted phosphorous acid.

EXAMPLE 2

As in example 1, aluminum hydroxide and phosphorous acid are reacted. The product contains 90.3% by weight of aluminum phosphite of the composition $Al_2(HPO_3)_2(H_2PO_3)_2$, 9.7% by weight of aluminum hydroxide and 0.45% by weight of phosphorous acid.

EXAMPLE 3

As in example 1, aluminum hydroxide and phosphorous acid are reacted. The product contains 99.6% by weight of aluminum phosphite of the composition $Al_2(HPO_3)_{2.97}(H_2PO_3)_{0.06}$, 0.4% by weight of aluminum hydroxide and 0.05% by weight of phosphorous acid.

EXAMPLE 4 (Comparative)

Noninventive, commercially available aluminum phosphite shows a lower thermal stability in comparison ($PH_3$ formation from 320° C.).

EXAMPLE 5

233 g of mixture of aluminum hydrogenphosphites with aluminum hydroxide are initially charged in a kneader. While mixing, 1787.2 g (22.82 mol) of aluminum hydroxide (Hydral® 710; from ALCOA; 99.6%) and, in portions, 2864 g (34.23 mol) of phosphorous acid (thus, aluminum source and phosphite source in a molar ratio of 2 to 3) are added thereto. A reaction occurs spontaneously with evolution of heat. The mixture is left to react at 80° C. for a further 0.5 h and then at 150° C. for 2 h. The product contains 98.8% by weight of aluminum phosphite of the composition $Al_2(HPO_3)_{2.84}(H_2PO_3)_{0.08}$, 1.4% by weight of aluminum hydroxide and 0.2% by weight of unconverted phosphorous acid.

TABLE

Amounts, conditions and analysis results

| | Raw materials | | Reaction conditions | | $PH_3$ formation | Al hydrogenphosphite/Al salt mixture | | | |
|---|---|---|---|---|---|---|---|---|---|
| Example | ATH [mol] | $H_3PO_3$ [mol] | Temperature [° C.] | Time [h] | temperature [° C.] | Soluble $H_3PO_3$ [% by wt.] | ATH content [% by wt.] | Al hydrogen-phosphite content [% by wt.] | Al-hydrogen-phosphite composition |
| 1 | 20.54 | 34.23 | 155 | 3.0 | 340 | 0.25 | 1.4 | 98.6 | $Al_2(HPO_3)_{2.89}(H_2PO_3)_{2.00}$ |
| 2 | 22.82 | 34.23 | 120 | 3.0 | 340 | 0.45 | 9.7 | 90.3 | $Al_2(HPO_3)_{2.00}(H_2PO_3)_{2.00}$ |
| 3 | 22.82 | 34.23 | 155 | 4.5 | 340 | 0.05 | 0.4 | 99.6 | $Al_2(HPO_3)_{2.97}(H_2PO_3)_{0.06}$ |
| 4 | — | — | — | — | 320 | — | — | 100.0 | $Al_2(HPO_3)_{3.00}$ |

Flame-retardant Polymer Molding Compositions and Polymer Moldings

50% by weight of nylon 66 polymer, 30% by weight of glass fibers, 3.6% by weight of mixture of aluminum hydrogenphosphite and aluminum salt according to example 1 and 16.4% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

50% by weight of polybutylene terephthalate polymer, 30% by weight of glass fibers, 3.6% by weight of mixture of aluminum hydrogenphosphite and aluminum salt according to example 1 and 16.4% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

The invention claimed is:

1. A mixture of aluminum hydrogenphosphites of the formula (I)

$$Al_{2.00}(HPO_3)_v(H_2PO_3)_y \cdot x(H_2O)_z \quad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4.

2. The mixture as claimed in claim 1, wherein
v is 2.56 to 2.99,
y is 0.9 to 0.02 and
z is 0 to 1.

3. The mixture as claimed in claim 1, wherein
v is 2.834 to 2.99,
y is 0.332 to 0.03 and
z is 0.01 to 0.1.

4. The mixture as claimed in claim 1, comprising 95 to 99.9% by weight of aluminum hydrogenphosphites of the formula (I), 0.1 to 5% by weight of aluminum salts and 0 to 50% by weight of water (of crystallization).

5. The mixture as claimed in claim 1, wherein the aluminum salts are oxides, hydroxides, peroxides, peroxide hydrates, carbonates, percarbonates, mixed carbonates/hydrates, formates, acetates, propionates, stearates, lactates, ascorbates, oxalates, or aluminum salts with anions of acids having a higher vapor pressure than phosphorous acid.

6. The mixture as claimed in claim 1, having
a particle size of 0.1 to 1000 μm,
a solubility in water of 0.01 g/l to 10 g/l,
a bulk density of 80 to 800 g/l and
a residual moisture content of 0.1 to 5%.

7. A process for preparing a mixture of aluminum hydrogenphosphites of the formula (I)

$$Al_{2.00}(HPO_3)_v(H_2PO_3)_y \cdot x(H_2O)_z \quad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4 comprising the step of reacting an aluminum source and a phosphite source without solvent at temperatures of 20 to 300° C. for 0.1 to 10 h.

8. The process as claimed in claim 7, wherein the aluminum sources are aluminum metal, aluminum alloys, oxides, hydroxides, peroxides, peroxide hydrates, carbonates, percarbonates, mixed carbonates/hydrates, formates, acetates, propionates, stearates, lactates, ascorbates, oxalates, or aluminum salts with anions of acids having a higher vapor pressure than phosphorous acid.

9. The process as claimed in claim 7, wherein the phosphite sources are phosphorous acid or precursors thereof, phosphorus trioxide, phosphorus trichloride, elemental phosphorus, hypophosphorous acid or mixtures thereof.

10. A flame-retardant thermoplastic or thermoset polymer molding composition or polymer molding, film, filament or fiber comprising 0.1 to 45% by weight of a mixture of aluminum hydrogenphosphites of the formula (I)

$$Al_{2.00}(HPO_3)_v(H_2PO_3)_y \cdot x(H_2O)_z \quad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4, 55 to 99.9% by weight of thermoplastic or thermoset polymer or mixtures thereof, 0 to 55% by weight of additives and 0 to 55% by weight of filler or a reinforcing material, where the sum of the components is 100% by weight.

11. The flame-retardant thermoplastic or thermoset polymer molding composition or polymer molding, film, filament or fiber as claimed in claim 10, wherein the flame retardant is dialkylphosphinic acids and/or salts thereof; condensation products of melamine, reaction products of melamine with phosphoric acid, reaction products of condensation products of melamine with polyphosphoric acid or mixtures thereof; nitrogen-containing phosphates of the formulae $(NH_4)_y H_{3-y} PO_4$ or $(NH_4 PO_3)_z$, where y is 1 to 3 and z is 1 to 10 000; benzoguanamine, tris(hydroxyethyl) isocyanurate, allantoin, glycoluril, melamine, melamine cyanurate, dicyandiamide, guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate, zinc stannate or mixtures thereof.

12. The flame-retardant thermoplastic or thermoset polymer molding composition or polymer molding, film, filament or fiber as claimed in claim 10, wherein the flame retardant is melam, melem, melon, dimelamine pyrophosphate, melamine polyphosphate, melam polyphosphate, melon polyphosphate, melem polyphosphate and mixed poly salts thereof, ammonium hydrogenphosphate, ammonium dihydrogenphosphate, ammonium polyphosphate or mixtures thereof.

13. The flame-retardant thermoplastic or thermoset polymer molding composition or polymer molding, film, filament or fiber as claimed in claim 10, wherein the flame retardant is aluminum hypophosphite, zinc hypophosphite, calcium hypophosphite, sodium phosphite, monophenylphosphinic acid and salts thereof, mixtures of dialkylphosphinic acids and salts thereof, monoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof, adducts onto para-benzoquinone, or itaconic acid and salts thereof.

14. An intermediate for further syntheses, a binder, a crosslinker or accelerator in the curing of epoxy resins, polyurethanes and unsaturated polyester resins, a polymer stabilizer, a crop protection composition, a sequestrant, a mineral oil additive, as an anticorrosive, a washing composition a cleaning composition or an electronic composition including a mixture of aluminum hydrogenphosphites of the formula (I)

$$Al_{2.00}(HPO_3)_v(H_2PO_3)_y x(H_2O)_z \qquad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4.

15. A flame retardant, a flame retardant for clearcoats and intumescent coatings, a flame retardant for wood and other cellulosic products, a reactive and nonreactive flame retardant for polymers, a flame-retardant polymer molding composition, a flame-retardant polymer molding a flame retardant for rendering polyester and pure and blended cellulose fabrics flame-retardant by impregnation, or a synergist in flame retardant mixtures comprising a mixture of aluminum hydrogenphosphites of the formula (I)

$$Al_{2.00}(HPO_3)_v(H_2PO_3)_y x(H_2O)_z \qquad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4.

16. A flame-retardant thermoplastic or thermoset polymer molding composition or polymer molding, film, filament or fiber comprising 0.1 to 45% by weight of a mixture of aluminum hydrogenphosphites of the formula (I)

$$Al_{2.00}(HPO_3)_v(H_2PO_3)_y x(H_2O)_z \qquad (I)$$

with aluminum salts comprising
91 to 99.9% aluminum hydrogenphosphites of the formula (I)
0.1 to 9% aluminum salts and
0 to 50% water (of crystallization),
where v in formula (I) is 2 to 2.99, y is 2 to 0.01 and z is 0 to 4 55 to 99.9% by weight of a flame retardant, 55 to 99.9% by weight of thermoplastic or thermoset polymer or mixtures thereof, 0 to 55% by weight of additives and 0 to 55% by weight of filler or a reinforcing material, where the sum of the components is 100% by weight.

* * * * *